US012811205B2

(12) United States Patent
Lu et al.

(10) Patent No.: US 12,811,205 B2
(45) Date of Patent: Nov. 24, 2026

(54) SOLID-STATE POLYMER ELECTROLYTE SYSTEMS AND BATTERIES USING THE SAME

(71) Applicant: The Regents of the University of California, Oakland, CA (US)

(72) Inventors: Jennifer Lu, Merced, CA (US); Michael Leveille, Merced, CA (US); Lexi Hefner, Merced, CA (US); Han-Lin Kuo, Merced, CA (US)

(73) Assignee: The Regents of the University of California, Oakland, CA (US)

( * ) Notice: Subject to any disclaimer, the term of this patent is extended or adjusted under 35 U.S.C. 154(b) by 438 days.

(21) Appl. No.: 18/595,391

(22) Filed: Mar. 4, 2024

(65) Prior Publication Data

US 2024/0297354 A1 Sep. 5, 2024

Related U.S. Application Data

(60) Provisional application No. 63/488,411, filed on Mar. 3, 2023.

(51) Int. Cl.

| | |
|---|---|
| ***H01M 10/42*** | (2006.01) |
| ***C08F 292/00*** | (2006.01) |
| ***C08G 81/00*** | (2006.01) |
| ***H01M 10/0565*** | (2010.01) |
| ***H01M 50/383*** | (2021.01) |

(52) U.S. Cl.

CPC ....... *H01M 10/4235* (2013.01); *C08F 292/00* (2013.01); *C08G 81/00* (2013.01); *H01M 10/0565* (2013.01); *H01M 50/383* (2021.01); *H01M 2300/0082* (2013.01)

(58) Field of Classification Search

None

See application file for complete search history.

(56) References Cited

U.S. PATENT DOCUMENTS 6,395,429 B1 * 5/2002 Kang ................ H01M 10/0565 429/317

* cited by examiner

*Primary Examiner* — Eli S Mekhlin

(74) *Attorney, Agent, or Firm* — Mintz, Levin, Cohn, Ferris, Glovsky and Popeo, P.C.

(57) ABSTRACT

Solid-state polymer electrolyte systems and methods of making the same are disclosed. The solid-state polymer electrolyte can be a multi-segmented polymer that includes two high-contrast segments. The high-contrast segments can be, respectively, soft segments and one or more hard segments. Batteries with a solid-state polymer electrolyte system is also disclosed.

20 Claims, 6 Drawing Sheets

50 Terephthaloyl chloride 60 4,4'-oxydianiline

70 P(4,4'-ODA-TCL)

80 PEO-bis(3-aminopropyl) terminated

90 P(4,4'-ODA-TCL-PEO)

SOLID-STATE POLYMER ELECTROLYTE SYSTEMS AND BATTERIES USING THE SAME

CROSS-REFERENCE TO RELATED APPLICATIONS

This application claims priority to U.S. Provisional Application No. 63/488,411, filed on Mar. 3, 2023, and titled "CHANNEL STRUCTURES FORMED BY THERMAL RESPONSIVE MULTISEGMENTED POLYMERS FOR IONIC CONDUCTION AND THERMAL MANAGEMENT," the entirety of which is incorporated by reference herein.

STATEMENT REGARDING FEDERALLY FUNDED RESEARCH

This invention was made with government support under grant number NNX15AQ01_6R awarded by the National Aeronautics and Space Administration (NASA). The government has certain rights in the invention.

FIELD

The technologies described in the present disclosure relate to solid-state polymer electrolyte systems for batteries and, in some exemplary aspects, for batteries including metals such as lithium or sodium as an anode material.

BACKGROUND

Next generation rechargeable batteries that employ metals as anodes, including lithium, sodium, and zinc, have recently gained great attention due to high energy density. The use of liquid electrolytes in current batteries can readily react with the solid metal anode electrode creating harsh operation conditions that can result in limited performance while increasing the risks of fire and explosion. To pursue next-generation energy storage devices with higher-energy density and safety, it is advantageous to replace liquid electrolytes with solid-state electrolytes. The current commercial solid-state electrolytes have major drawbacks including high internal resistance, inactive superfluous material content, low practical energy densities caused by lethargic ionic conductivity, and lack of intimate contact between electrolyte with electrode at all length scales. Accordingly, there is a need for improved solid-state electrolyte systems.

SUMMARY

For purposes of summarizing, certain aspects, advantages, and novel features have been described herein. It is to be understood that not all such advantages may be achieved in accordance with any one particular aspect. Thus, the disclosed subject matter may be embodied or carried out in a manner that achieves or optimizes one advantage or group of advantages without achieving all advantages as may be taught or suggested herein. The various features and items described herein may be incorporated together or separable, except as would not be feasible based on the current disclosure and what a skilled artisan would understand from it.

Solid-state polymer electrolyte systems are disclosed herein. In one exemplary aspect, the system includes a polymer electrolyte film having a multi-segmented polymer that includes soft segments and one or more hard segments.

In some aspects, the soft segments can include one or more low crystallinity polymers.

In some aspects, the low crystallinity polymer can include polyether, polyethylene, polyester polyol, or any combination thereof.

In some aspects, the one or more hard segments can be aromatic and can include one or more high crystallinity polymers, which wholly or partially include benzene rings or pseudo-aromatic heterocycles.

In some aspects, the soft segments can include low-molecular-weight soft segments with one hard segment of the one or more hard segments positioned between each soft segment.

In some aspects, the soft segments can include polyethylene oxide and the one or more hard segments include an aromatic polymer.

In some aspects, the soft segments can include an amine terminated polyethylene oxide and the one or more hard segments can include an aromatic amide monomer.

Batteries are also disclosed herein. In one exemplary aspect, a battery includes an electrode and the polymer electrolyte film as described above can be grafted onto the electrode is disclosed.

In some aspects, the electrode can include lithium, sodium, or zinc.

In some aspects, the electrode can further include carbon material.

Methods for forming a solid-state polymer electrolyte system are also disclosed. In one exemplary aspect, a method for forming a solid-state polymer electrolyte system includes forming a polymer electrolyte film and grafting the polymer electrolyte film onto an electrode of a battery. The polymer electrolyte film includes a multi-segmented polymer that includes soft segments and one or more hard segments In some aspects, the grafting of the polymer electrolyte film onto the electrode of the battery can include electrografting.

In some aspects, the forming and the grafting the polymer electrolyte film can occur simultaneously.

In some aspects, the grafting the polymer electrolyte film can include using a fluorinated monolayer.

In some aspects, forming the polymer electrolyte film can include forming the multi-segmented polymer. Forming the multi-segmented polymer can include forming a first solution comprising P(4, 4'-ODA-TCL); forming a second solution comprising PEO-bis(3-aminopropyl) terminated; and mixing the first and second solution to form a third solution comprising the multi-segmented polymer, in which the multi-segmented polymer includes P(4'4-ODA-TCL-PEO).

In some aspects, the method can include precipitating the multi-segmented polymer from the third solution and thereafter purifying the multi-segmented polymer.

In some aspects, forming the first solution can include combining a first mixture of a 0.5 M solution of terephthaloyl chloride (TCL) made in NMP, and a second mixture of 0.5 M solution of 4,4'-oxydianiline (4,4'-ODA) made in NMP with pyridine.

In some aspects, the first solution, the second solution, or each of the first and second solutions can include about 2-4 wt % LiCl or CaCl2

In some aspects, forming the first solution can include a combination of a 0.5 M solution of terephthaloyl chloride (TCL) made in NMP, and a 0.5 M solution of 4,4'-oxydianiline (4,4'-ODA) made in NMP with about 2-4 wt % LiCl or CaCl2.

Another aspect includes a solid-state polymer electrolyte system obtained by the method disclosed above.

BRIEF DESCRIPTION OF THE DRAWINGS

The foregoing and other objects of the present disclosure, the various features thereof, as well as the disclosure itself may be more fully understood from the following description, when read together with the accompanying drawings in which.

DETAILED DESCRIPTION

Figure 1:
FIG. 1 is an image showing a result of an atomic force microscopic imaging analysis performed on an example material consistent with the current disclosure.

The current disclosure relates to batteries and a synthetic approach for manufacturing that employs self-assembly of a new type of solid-state polymer electrolyte systems with a grafted polymer electrolyte film on an electrode. This approach can enable a kinetically favorable environment for electrochemical reaction(s) in three dimensions. Such a system can address key critical challenges in battery technologies. The present synthetic strategy disclosed herein not only offers intimate contact at nanoscale but also addresses key challenges such as cycle instability and low particle energy and power density.

In general, the present solid-state polymer electrolyte system can include a polymer electrolyte film, which can include a multi-segmented polymer that can include soft segments and one or more hard segments (e.g., one or more aromatic hard segments). The polymer electrolyte film can have a thickness in the range of, e.g., about 10-50 microns, about 5-80 microns, or about 20-40 microns. A solid-state polymer electrolyte system consistent with aspects of the current disclosure is based on multi-segmented polymers that can include soft segments (e.g., low crystallinity polymer, such as polyether, polyethylene, polyester polyol, etc) and aromatic hard segments (e.g., high crystallinity polymers, which wholly or partially include benzene rings or pseudo-aromatic heterocycles). Due to different crystallinity of polymer segments, ion transport occurs through the low-crystalline soft segment but not the high-crystalline hard segment, creating a one-dimensional channel-like morphology. The multi-segmented polymer chain can be viewed as a long polymer made of multiple low-molecular-weight (e.g., less than 10,000) soft segments with one hard segment (having a molecular weight of, e.g., about 5,000-12,000) sandwiched in between each soft segment. In addition to the direct ion transport pathway, this arrangement can effectively lower glass transition and melting temperatures to boost ionic conductivity at room temperature.

The multi-segmented polymers described herein exhibit notable advantages when employed as solid-state electrolyte systems and membranes in batteries.

For example, the multi-segmented polymer systems can contribute to a reduction in polarization overpotential. This effect is achieved through the electrostatic attraction between anionic functional groups (e.g., functional groups with partial negative charges, such as carboxyl groups, carbonyl groups, sulfonate groups, etc.) on the polymer chain and metal ions (e.g., $Li^+$, $Na^+$, $Zn^{2+}$), promoting their diffusion. The channel structure of the polymer also facilitates the preferential diffusion of metal ions, allowing them to traverse the polymeric material through hopping between anionic functional groups. This mechanism reduces the concentration gradient of metal ions during charge and discharge cycles, consequently mitigating severe polarization overpotential. The diminished overpotential leads to an increased operational potential range and rate capability.

Another advantage of the present systems described herein is the ability to produce low-cost multifunctional and solid-state electrolyte systems that can enhance safety by preventing conventional liquid electrolyte problems, such as leakage, flammability, and chemical instability. The aromatic hard segment within the polymer can function as a flame retardant, contributing to enhanced safety by yielding a high char yield residue. Such systems can improve safety with enhanced cycle stability and practical high energy and power density relative to homopolymers and conventional block copolymers.

Further, the polymer designs described herein can aid in preventing dendrite formation. Solid-state polymeric electrolytes can help mitigate the formation of dendrites, which are microscopic metal ions deposit that can grow on the surface of electrodes and cause short circuits. Taken all together, uniform metal ion plating and stripping can be achieved to mitigate dendrite formation and improve cycle stability. The self-assembled aromatic hard segments can potentially suppress the ion diffusion, therefore promoting directional ion diffusion along the soft segment and further enhancing coulombic efficiency and cycle stability. The solid-state electrolyte can provide a more stable environment, reducing the risk of dendrite formation and improving the overall cycle life of the battery. The aromatic hard segment in the multi-segmented polymer can serve as a crosslinker, enhancing the mechanical properties of the solid-state electrolyte and thereby inhibiting dendrite formation.

The present multi-segmented polymers can allow tailoring for specific properties, e.g., specific material properties that meet the requirements of the intended application, thereby offering a more customized solution. This flexibility surpasses that of a single polymer (e.g., non-segmented polymer) with fixed characteristics.

Further, the present designs disclosed herein can foster better adhesion between polymer and electrode surfaces. The electro-grafting process forms covalent bonds between the polymer chains and electrode surface, providing a robust connection and maximizing efficient contact area. This great adhesion would also add benefits to the interfacial charge transfer resistance as well as contribute to a reduction in interfacial charge transfer resistance, further enhancing the overall performance of the battery system, such as longer cycle life and reduced capacity fade.

In one aspect, a multi-segmented polymer can include two high-contrast segments that are synthesized. The high-contrast segments can include, respectively, a soft segment of polyethylene oxide (PEO) and a hard segment of aromatic polymer [a poly(amide) or poly(ester)]. Atomic force microscopic imaging analysis (5 by 5 microns), an example image of which is shown in FIG. 1, showing that the resulting polymer film P(4,4'-ODA-TCL-PEO) can be made of uniform and ultralong 1D fiber-like structures which can potentially serve as channels for ion transport.

Figure 2:
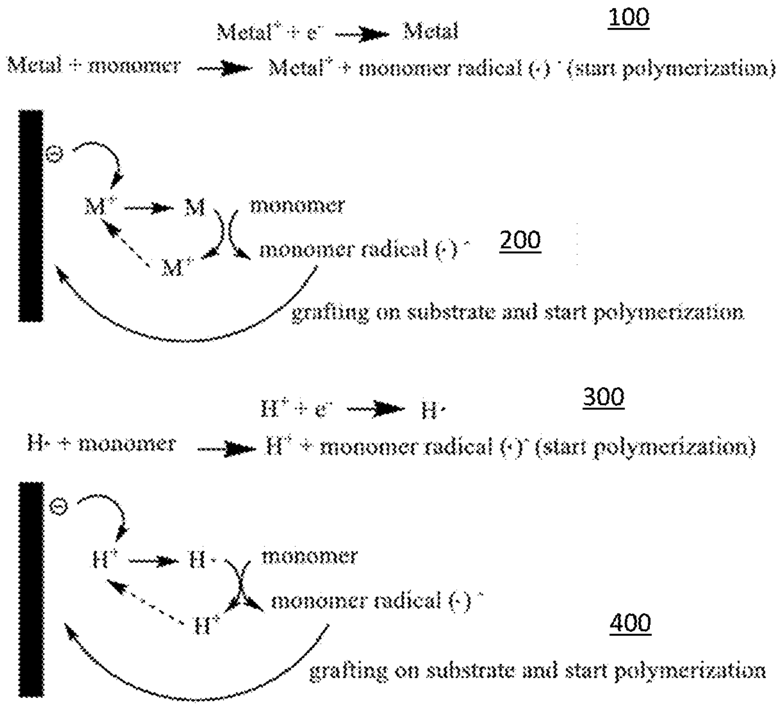
FIG. 2 is an illustration of certain process features consistent with the grafting of polymers onto an electrode material consistent with aspects of the current subject matter.

In one aspect, a method for practicing certain aspects of the current subject matter can include, as shown in FIG. 2, which illustrates the formation of a solid-state polymer electrolyte system, dissociating electrons from electrode material (e.g., a pure lithium anode or a carbon-metal oxide cathode) to result in metal ions ($Metal^+$) as shown in step 100 in FIG. 2 and a monomer radical or free hydrogen radicals (H.) as shown in step 300, either of which can trigger polymerization. Further, for example, after the monomer radical is formed, it can be grafted onto the substrate, which in this case is the electrode, and start polymerization as shown in steps 200 or 400. The grafted monomer on the substrate can further react with other monomers, generating a polymeric film of a multi-segmented polymer. As such, in this illustrated aspect, the polymer electrolyte film formed and electro-grafted onto the electrode simultaneously. Multi-segmented polymers can be used here as they (1) have a theoretically simple synthesis procedure and (2) easily self-assemble into a channel structure, facilitating ion transport through the soft segment.

In some aspects, the single-segmented polymers that can be grafted on to a substate (e.g., an electrode) before multi-block synthesis can include, e.g., one or more of the following single-segmented polymers A, B, or C:

A

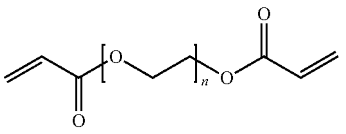

B

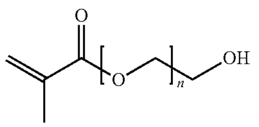

C

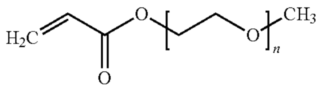

Figure 3:
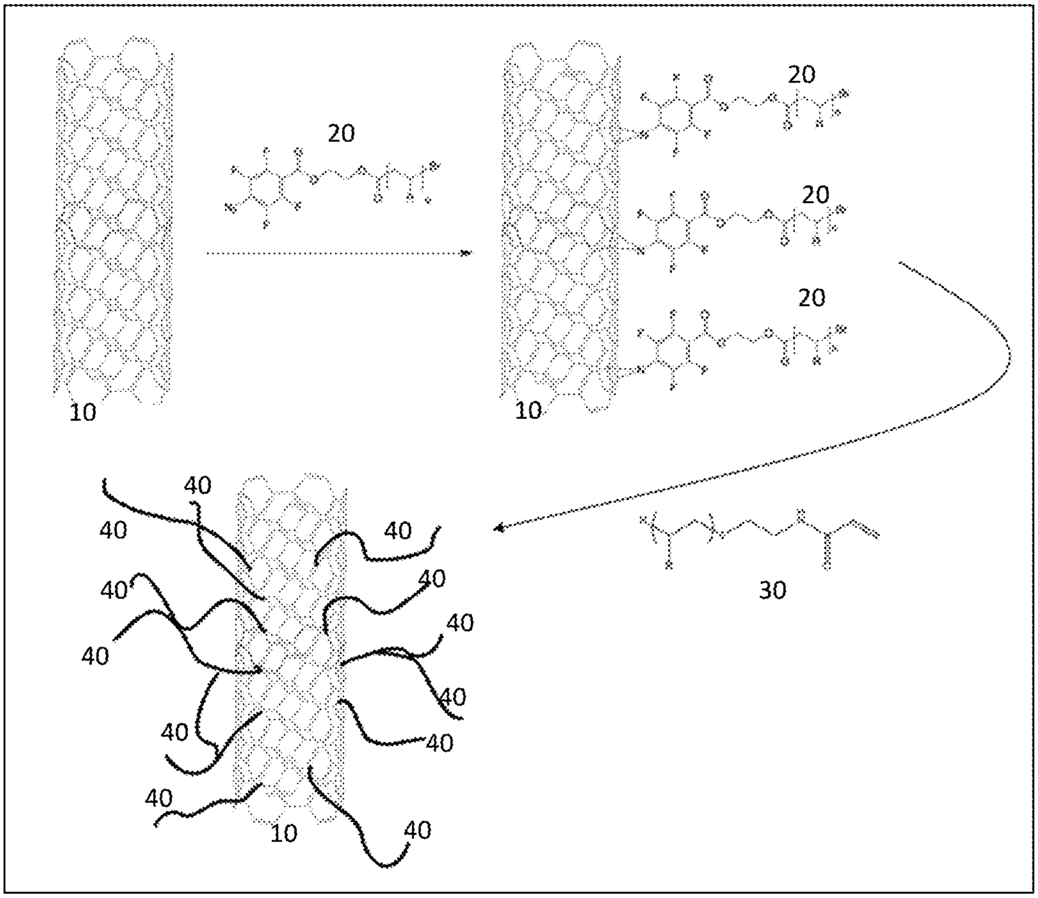
FIG. 3 is an illustration of grafting of a fluorinated monolayer on a carbon electrode.

Another method of forming a solid-state polymer electrolyte system, exemplary features of which are illustrated in FIG. 3, can include grafting polymer chains 30 onto a carbon material, in this case carbon nanotubes (CNTs) 10, via a fluorinated monolayer 20. Fluorination is a common method to functionalize CNTs. The fluorinated monolayer on the CNTs and the polymer chain can then bond through a bromine-alkene electrophilic addition reaction, creating a multi-segmented polymer 40.

Figure 4:
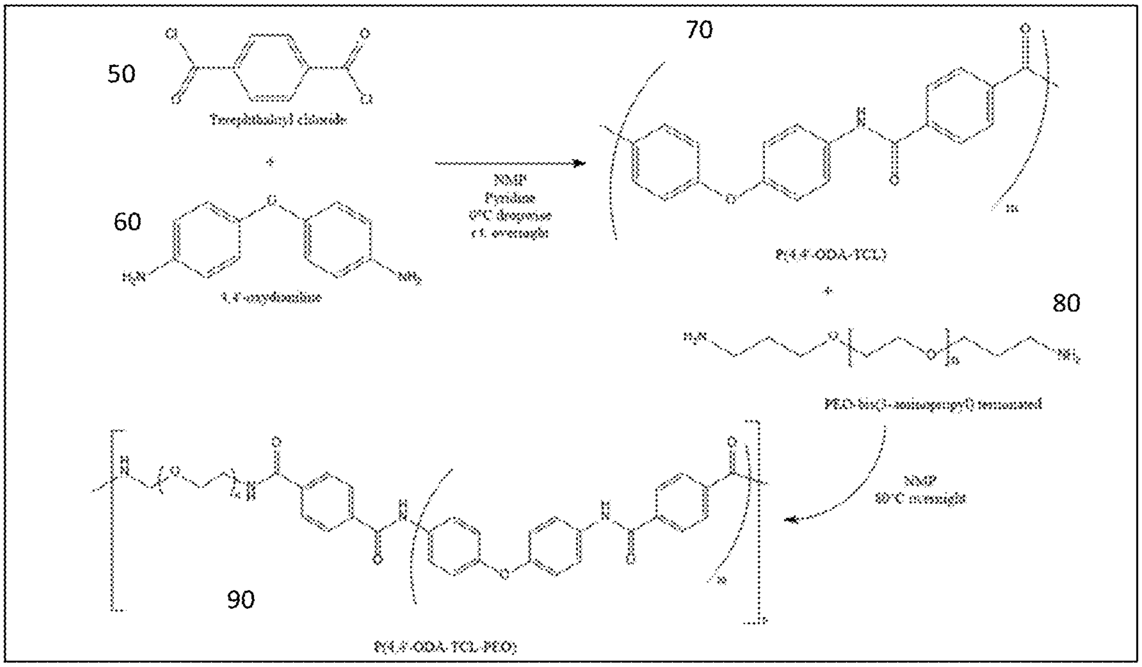
FIG. 4 shows an illustration of the synthetic routes of an example multi-segmented polymer as well as the thermogravimetric analysis characterization and image of the example product.

Provided is an example synthetic procedure of forming a multi-segmented polymer 90 using an aromatic amide monomer 60 and amine-terminated PEO 80 which is also illustrated in FIG. 4:

Step 1, poly(amide) synthesis 70: In a glovebox under Ar, a 0.5 M solution of terephthaloyl chloride (TCL) [1.5 eq.] 50 is made in N-methyl-2-pyrrolidone (NMP). A 0.5 M solution of 4,4'-oxydianiline (4,4'-ODA) [1 eq.] in NMP with pyridine [4 eq.] is also made. After stirring at room temperature for 15 minutes, the 4,4'-ODA solution is cooled to 0° C. The clear TCL solution is added dropwise at 2-3 mL/hr. After the addition is completed, stir at room temperature overnight.

Step 2, multi-segmented polymer synthesis 90: In a glovebox under Ar, a 140 mg/mL solution of PEO-bis(3-aminopropyl) terminated, Mn 1500, is made in NMP. This (30 wt %) is added dropwise to the above poly(amide) solution (70 wt %). Once all is added, the solution is stirred at 80° C. overnight. The multi-block polymer is collected by precipitation in water and purified via Soxhlet extraction in tetrahydrofuran (THF).

Some procedure modifications based on desired product (s) include but are not limited to: 2-4 wt % LiCl or $CaCl_2$) can be added in addition to or instead of pyridine as well as to the PEO solution, as they all help improve solubility and increase the final molecular weight; purification can be done with a repeated dissolving-precipitation process in a poor solvent instead of by Soxhlet extraction; different polymers such as poly(ester)s can be synthesized in step 1.

Figure 5:
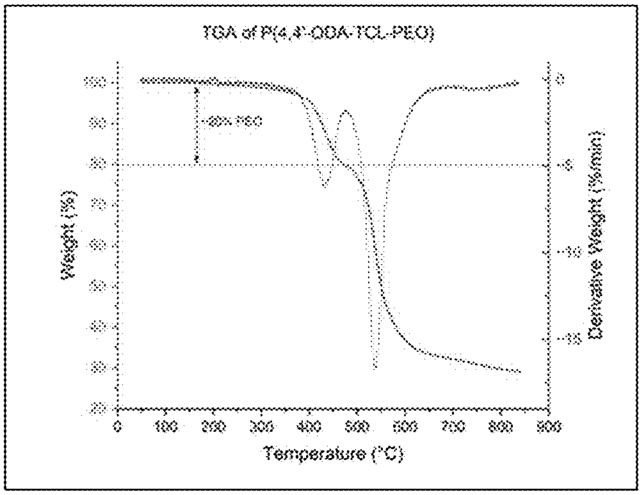
FIG. 5 is a thermogravimetric analysis (TGA) graph of an exemplary multi-segmented polymer, P(4, 4'-ODA-TCL), consistent with the current disclosure.

FIG. 5 is a thermogravimetric analysis (TGA) graph of an example product, showing high thermal stability up to about 400° C. and a final experimental composition of about 20 wt % PEO.

Figure 6:
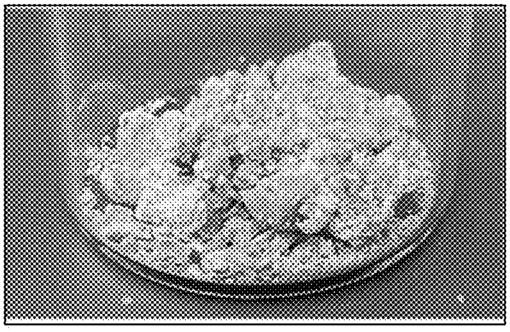
FIG. 6 is a phot illustrating a multi-segmented polymer consistent with the current disclosure.

FIG. 6 is a photo illustrating the multi-segmented polymer.

Figure 7:
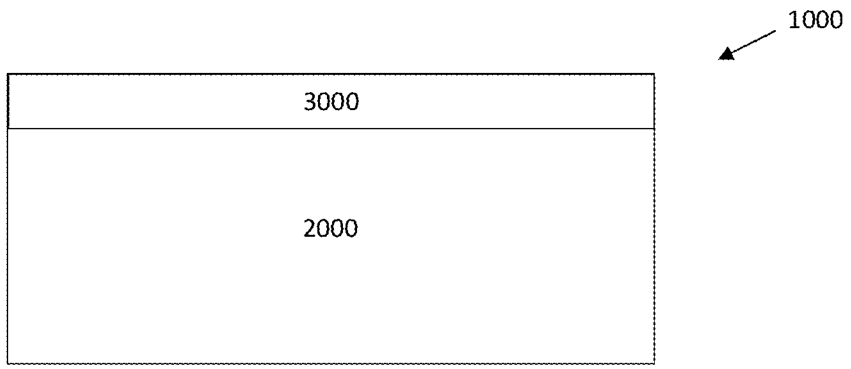
FIG. 7 shows an exemplary battery having a solid-state polymer system consistent with the current disclosure.

In some aspects, a battery in accordance with various aspects disclosed herein can include an electrode, and a polymer electrolyte film grafted onto the electrode. The polymer electrolyte film can be obtained through exemplary processes described above. In some aspects, the electrode can include lithium, sodium, and/or zinc. In some aspects, the electrode can also include a carbon material. FIG. 7 schematically shows an exemplary battery 1000 with a polymer electrolyte film 3000 grafted onto an electrode 2000 of the battery 1000. While a carbon material is not shown in the drawings, a person skilled in the art would appreciate that the battery can include a carbon material.

Unless defined otherwise, all technical and scientific terms used herein have the same meaning as commonly understood by one of ordinary skill in the art to which this disclosure belongs. The initial definition provided for a group or term herein applies to that group or term throughout the present specification individually or as part of another group, unless otherwise indicated.

For the purposes of explaining the invention, well-known features of lithium battery technology known to those skilled in the art of lithium batteries have been omitted or simplified in order not to obscure the basic principles of the invention. Parts of the following description will be presented using terminology commonly employed by those skilled in the art of optical design.

As used herein, the articles "a" and "an" refer to one or to more than one (i.e., to at least one) of the grammatical object of the article. By way of example, "an element" means one element or more than one element. Furthermore, use of the term "including" as well as other forms, such as "include," "includes," and "included," is not limiting.

As used herein, the term "about" will be understood by persons of ordinary skill in the art and will vary to some extent on the context in which it is used. As used herein when referring to a measurable value such as an amount, a temporal duration, and the like, the term "about" is meant to encompass variations of ±20% or ±10%, including ±5%, ±1%, and ±0.1% from the specified value, as such variations are appropriate to perform the disclosed methods.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

The implementations set forth in the foregoing description do not represent all implementations consistent with the subject matter described herein. Instead, they are merely some examples consistent with aspects related to the described subject matter. Although a few variations have been described in detail herein, other modifications or additions are possible. In particular, further features and/or variations can be provided in addition to those set forth herein. For example, the implementations described above can be directed to various combinations and sub-combinations of the disclosed features and/or combinations and sub-combinations of one or more features further to those disclosed herein. In addition, the logic flows depicted in the accompanying figures and/or described herein do not necessarily require the particular order shown, or sequential order, to achieve desirable results. The scope of the following claims may include other implementations or aspects.

EQUIVALENTS

Those skilled in the art will recognize, or be able to ascertain, using no more than routine experimentation, numerous equivalents to the specific aspects described specifically herein. Such equivalents are intended to be encompassed in the scope of the following claims.

What is claimed is:

1. A solid-state polymer electrolyte system comprising:
a P(4, 4'-ODA-TCL-PEO) polymer electrolyte film comprising a multi-segmented polymer that includes soft segments and one or more hard segments.

2. The solid-state polymer electrolyte system of claim 1, wherein the soft segments comprise one or more low crystallinity polymers.

3. The solid-state polymer electrolyte system of claim 1, wherein the soft segments include low-molecular-weight soft segments with one hard segment of the one or more hard segments positioned between each soft segment.

4. A battery comprising:
an electrode; and
the P(4, 4'-ODA-TCL-PEO) polymer electrolyte film of claim 1 grafted onto the electrode.

5. The battery of claim 4, wherein the electrode comprises lithium, sodium, or zinc.

6. The battery of claim 5, wherein the electrode further comprises carbon material.

7. The battery of claim 4, wherein the electrode comprises carbon material.

8. The battery of claim 7, wherein the carbon material comprises a carbon-metal oxide.

9. The solid-state polymer electrolyte system of claim 1, wherein the P(4, 4'-ODA-TCL-PEO) polymer electrolyte film has a thickness from about 5-80 microns.

10. The solid-state polymer electrolyte system of claim 1, wherein the P(4, 4'-ODA-TCL-PEO) polymer electrolyte film has a thickness from about 10-50 microns.

11. The solid-state polymer electrolyte system of claim 1, wherein the P(4, 4'-ODA-TCL-PEO) polymer electrolyte film has a thickness from about 20-40 microns.

12. A method for forming a solid-state polymer electrolyte system comprising:
forming a polymer electrolyte film comprising a multi-segmented polymer that includes soft segments and one or more hard segments; and
grafting the polymer electrolyte film onto an electrode of a battery;
wherein forming the polymer electrolyte film comprises forming the multi-segmented polymer, wherein forming the multi-segmented polymer comprises:
forming a first solution comprising P(4, 4'-ODA-TCL);
forming a second solution comprising PEO-bis(3-aminopropyl) terminated; and
mixing the first and second solution to form a third solution comprising the multi-segmented polymer, wherein the multi-segmented polymer comprises P(4, 4'-ODA-TCL-PEO).

13. The method of claim 12, wherein the grafting of the polymer electrolyte film onto the electrode of the battery comprises electro-grafting.

14. The method of claim 12, wherein the forming and the grafting the polymer electrolyte film occurs simultaneously.

15. The method of claim 12, wherein the grafting the polymer electrolyte film includes using a fluorinated monolayer.

16. The method of claim 12, further comprising precipitating the multi-segmented polymer from the third solution and thereafter purifying the multi-segmented polymer.

17. The method of claim 12, wherein forming the first solution comprises combining a first mixture of a 0.5 M solution of terephthaloyl chloride (TCL) made in NMP, and a second mixture of 0.5 M solution of 4,4'-oxydianiline (4,4'-ODA) made in NMP with pyridine.

18. The method of claim 17, wherein the first solution, the second solution, or each of the first and second solutions further comprise about 2-4 wt % LiCl or $CaCl_2$.

19. The method of claim 12, wherein forming the first solution comprises a combination of a 0.5 M solution of terephthaloyl chloride (TCL) made in NMP, and a 0.5 M solution of 4,4'-oxydianiline (4,4'-ODA) made in NMP with about 2-4 wt % LiCl or $CaCl_2$.

20. A solid-state polymer electrolyte system obtained by the method of claim 12.

* * * * *